US008032090B2

(12) United States Patent
Piovaccari et al.

(10) Patent No.: US 8,032,090 B2
(45) Date of Patent: Oct. 4, 2011

(54) ANTENNA FOR USE IN PORTABLE APPLICATIONS (75) Inventors: Alessandro Piovaccari, Austin, TX (US); Geoffrey B. Noakes, Chicago, IL (US); Daniel Mark Thompson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 515 days.

(21) Appl. No.: 11/824,190

(22) Filed: Jun. 29, 2007

(65) Prior Publication Data

US 2009/0004977 A1 Jan. 1, 2009

(51) Int. Cl.
H04B 1/38 (2006.01)

(52) U.S. Cl. .................. 455/90.3; 455/575.2; 455/575.7

(58) Field of Classification Search .............. 455/97, 455/90.3
See application file for complete search history.

(56) References Cited

U.S. PATENT DOCUMENTS

| | | | | |
|---|---|---|---|---|
| 4,363,935 A * | 12/1982 | Toya | ............. | 455/570 |
| 4,648,130 A * | 3/1987 | Kuznetz | ............. | 455/351 |
| 4,688,262 A * | 8/1987 | Schaefer et al. | ............. | 455/90.2 |
| 7,565,458 B2 * | 7/2009 | Thijssen et al. | ............. | 710/16 |
| 2002/0002056 A1 * | 1/2002 | Kobayashi | ............. | 455/517 |
| 2002/0132610 A1 * | 9/2002 | Chaplin et al. | ............. | 455/414 |
| 2004/0061659 A1 * | 4/2004 | Dunn et al. | ............. | 343/788 |
| 2004/0129951 A1 * | 7/2004 | Karasudani | ............. | 257/202 |
| 2004/0152457 A1 * | 8/2004 | Goldstein et al. | ............. | 455/419 |
| 2004/0207565 A1 * | 10/2004 | Hibino et al. | ............. | 343/860 |
| 2005/0113025 A1 * | 5/2005 | Akamatsu et al. | ............. | 455/41.3 |
| 2006/0052144 A1 * | 3/2006 | Seil et al. | ............. | 455/575.1 |
| 2007/0082634 A1 * | 4/2007 | Thijssen et al. | ............. | 455/169.1 |
| 2007/0127741 A1 * | 6/2007 | Kimura et al. | ............. | 381/111 |
| 2008/0051131 A1 * | 2/2008 | Ibrahim et al. | ............. | 455/552.1 |
| 2008/0051160 A1 * | 2/2008 | Seil et al. | ............. | 455/575.1 |
| 2008/0062053 A1 * | 3/2008 | Marko et al. | ............. | 343/713 |
| 2008/0188209 A1 * | 8/2008 | Dorogusker et al. | ............. | 455/414.2 |
| 2009/0209217 A1 * | 8/2009 | Coersmeier et al. | ............. | 455/142 |

FOREIGN PATENT DOCUMENTS

| | | |
|---|---|---|
| JP | 2001-308978 | 11/2001 |
| JP | 2001-308979 | 11/2001 |
| JP | 2006-197088 | 7/2006 |
| WO | 2007/042855 | 4/2007 |

OTHER PUBLICATIONS

Lee, Ki-Chang, Combined-Use Assembly of Mobile Telephone and Audio (WO 00/70779), Nov. 23, 2000.*
Korean Patent Office, International Search Report and Written Opinion for International Application No. PCT/US2008/068326, 8 Pages, Jan. 9, 2009.
Silicon Labs, "Si4730/31 Broadcast AM/FM Radio Receiver," Jan. 22, 2007, 1 page.
U.S. Appl. No. 11/636,021, filed Dec. 8, 2006, entitled "Providing Channel Filtering in an Automatic Frequency Control Path," by Andrew W. Krone.
State Intellectual Property Office, P.R. China, First Notice of Amendment, Dated Feb. 5, 2010, in Chinese patent application serial No. 200890000072.4.

* cited by examiner

*Primary Examiner* — Temesgh Ghebretinsae
*Assistant Examiner* — Erica Fleming-Hall
(74) *Attorney, Agent, or Firm* — Trop, Pruner & Hu, P.C.

(57) ABSTRACT

In one embodiment, the present invention includes an accessory device for coupling to a portable system having an AM radio receiver. The accessory device includes a housing to house at least one accessory component and an AM antenna.

14 Claims, 5 Drawing Sheets

ANTENNA FOR USE IN PORTABLE APPLICATIONS

FIELD OF THE INVENTION

Embodiments of the present invention relate to radios, and more particularly to such radios including an amplitude modulation (AM) receiver.

BACKGROUND

Radios including AM and frequency modulation (FM) receivers are well known are pervasive. While such radios have conventionally been manufactured from discrete analog components, trends in the semiconductor industry are leading to the development of digitally-based radio receivers including AM/FM receivers which may be formed in various semiconductor processes including, for example, complementary metal oxide semiconductor (CMOS) processes. In this way, radios can be designed that consume very little space. Accordingly, such radios can be incorporated in smaller and smaller devices.

Thus while standalone radios, which may be present in stereo systems such as home theater systems, table radios and so forth, continue to be manufactured, additional markets are becoming available to incorporate AM/FM radios within portable devices such as portable media players, portable digital systems (PDAs), cellular handsets and so forth.

To operate, an AM radio must have an AM antenna connected to it in order to receive incoming AM signals. However, due to the size of conventional AM antennas, certain problems exist in integrating an AM receiver into a portable device. First, the size of a typical AM antenna such as a ferrite rod antenna can preclude a given antenna's use in many portable products. Second, for the antenna that is included, interference issues may exist. For example, in a portable device that includes a display such as a liquid crystal display (LCD), noise caused by high-speed digital switching in the LCD may cause too much interference for accurate recovery of incoming AM signals by the AM antenna. Typically, an AM antenna should be separated from such a display by more than at least 6 inches. This may be difficult or impossible in a portable device. Thus there are various issues with regard to incorporating an AM receiver in a portable device.

SUMMARY OF THE INVENTION

In one aspect the present invention includes an accessory device for coupling to a portable system having an AM radio receiver. The accessory device includes a housing to house at least one accessory component and an AM antenna. As one example, the accessory device may be headphones, where the AM antenna is included in a cabling portion of the headphones. While the scope of the present invention is not limited in this regard, the AM antenna may be a miniature ferrite loop antenna.

An external connector may be used to connect the accessory device to the portable system. In one implementation, the external connector may include a pair of audio contacts to provide audio signals to the headphones, an antenna contact to provide an AM signal from the AM antenna to the AM radio receiver, and a ground contact.

Another aspect of the present invention is directed to yet another accessory device to be coupled between the accessory device and the portable system. This second accessory device may couple the AM antenna to the portable system, while at the same time preventing an audio output signal to the accessory device. In this way, the audio output signal may be output from the portable system itself.

Another aspect is directed to a method for automatically detecting presence of an antenna located externally from a portable device with an AM receiver, enabling functionality of the AM receiver if the external antenna is detected, otherwise disabling the functionality and reporting the non-functionality to a user of the portable device. The detection may be automatically performed using a controller of the portable device and enabling the AM receiver via a control signal from the controller if the antenna is detected. In other embodiments, the automatic detection may be via a tuning algorithm of an input matching network of the AM receiver.

Yet another aspect of the present invention is directed to a system including a portable system including an amplitude modulation (AM) radio receiver integrated on a complementary metal oxide semiconductor (CMOS) substrate and an output device to output an AM audio signal. The system may further include an accessory device for coupling to the portable system, where the accessory device includes an AM antenna and a connector to enable the coupling. The connector may have first and second audio contacts to enable receipt of the AM audio signal from the portable system and an antenna contact to enable transmission of an AM radio signal from the AM antenna to the portable system. The portable system may have an input matching network coupled between an input connector and the AM radio receiver to receive the AM radio signal and couple a variable capacitance to the AM radio signal and to automatically detect the antenna's presence using a tuning algorithm. Still further, a second accessory device may be coupled between the accessory device and the portable system to couple the AM antenna to the portable system and to prevent the AM audio signal from transmission to the accessory device.

DETAILED DESCRIPTION

In various embodiments, an external AM antenna may be provided for use in connection with a portable AM receiver. Such receiver may be present in various manners of portable devices including, but not limited to, portable media players, PDAs, cellular handsets and so forth. Depending upon a given embodiment, this external AM antenna may be located in an accessory device or other external device for use with the portable device. The AM antenna may take various forms such as a ferrite bar antenna, loop stick antenna or so forth.

Embodiments of the present invention may be used to automatically detect presence of such an AM antenna and to enable or disable AM functionality in a portable device based on the presence or absence of such an AM antenna. This automatic detection may be performed by various components within a system. For example, in some implementations a main controller of a portable device such as a microcontroller unit (MCU) may perform the automatic detection, while in other embodiments a radio receiver component such as a CMOS AM/FM radio, which may be in the form of an AM/FM combined transmitter and receiver (i.e., a transceiver) or just a receiver, may perform the automatic detection and inform the system MCU accordingly.

While the scope of the present invention is not limited in this regard, in some embodiments an AM receiver may be implemented using a substantial amount of digital circuitry, and an entire AM receiver may be implemented on a single integrated circuit (IC) having both analog front-end circuitry to receive and downconvert an incoming RF signal, as well as digital circuitry such as a digital signal processor (DSP) or other digital circuitry to process the baseband signal to obtain a demodulated output. Furthermore, in some implementations an AM receiver may be combined in a single IC (e.g., on the same monolithic die) with an FM receiver/transmitter (i.e., transceiver). In such embodiments, a substantial amount of circuitry for both AM and FM reception modes, as well as for FM transmission, may be reused. In some implementations, to effect such operations a single set of receiver circuitry may be provided, and a different firmware image may be selected for operation in an AM or FM mode. Owing to the relatively small size of such an IC, embodiments may be configured for use in many different portable devices Referring now to FIG. 1, in accordance with embodiments of the invention described herein, a multimode combined AM/FM transceiver 10, which may be fabricated on a monolithic semiconductor die 11, has several different signal processing modes of operations, in which the transceiver 10 may perform FM transmission, AM or FM reception, analog mixing, digital mixing and codec functions. More specifically, the multimode FM transceiver 10 may be configured by loading of different firmware images to operate as a receiver only; in combined receive and transmit modes; and an audio mode in which the transceiver 10 functions as a codec. In each of these modes of operation, the multimode transceiver 10 may perform various analog and/or digital mixing functions. Additionally, in accordance with some embodiments of the invention, the multimode transceiver 10 includes a digital audio interface 16, which allows the communication of digital audio signals between the transceiver 10 and circuitry ("off-chip" circuitry, for example) external to the transceiver 10.

Figure 1:
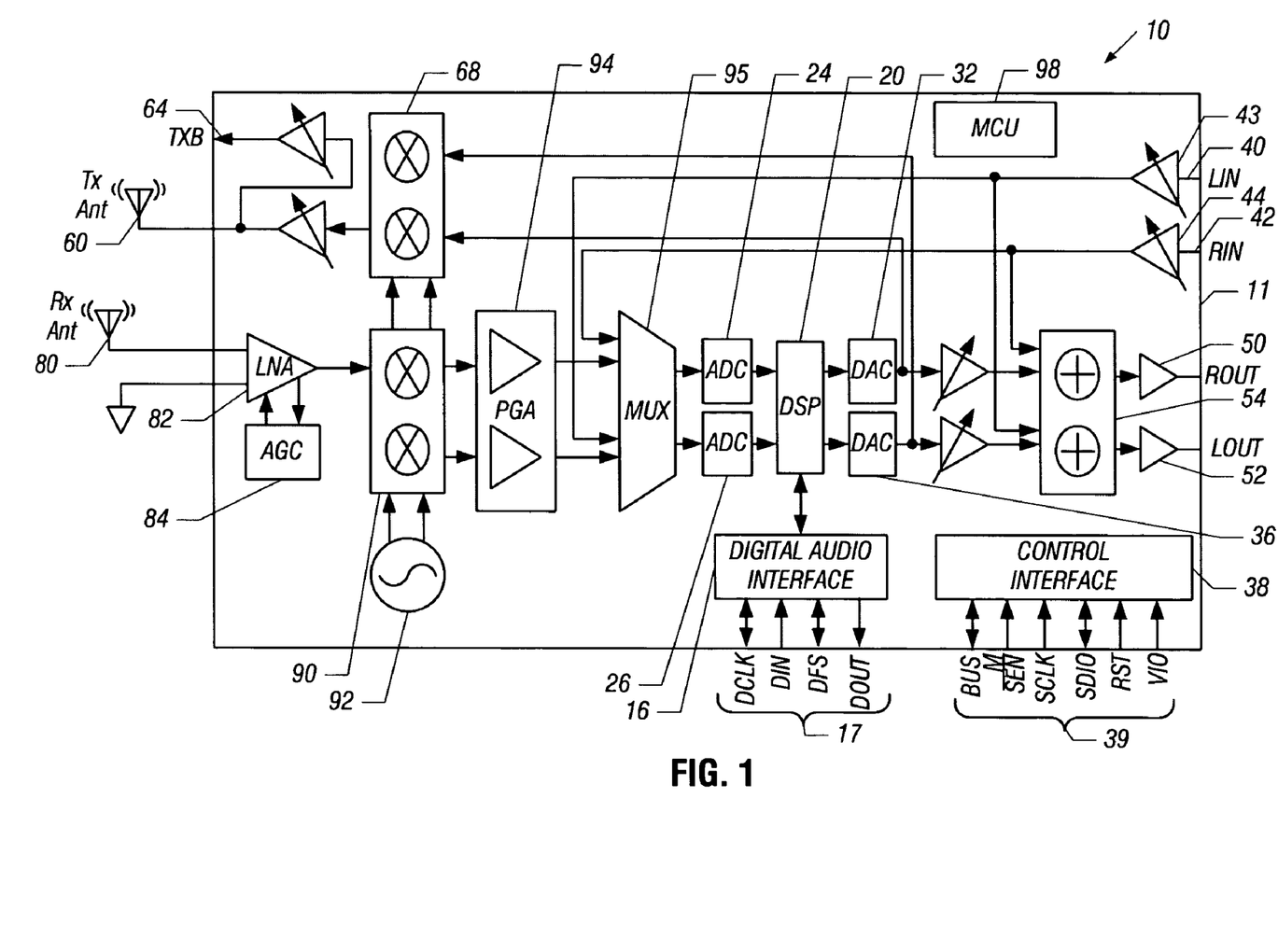
FIG. 1 is a block diagram of a multimode combined AM/FM transceiver in accordance with an embodiment of the present invention.

The multimode transceiver 10 may receive various input source signals in accordance with some embodiments of the invention: a digital audio (called "DIN"), which is received through the digital audio interface 16; an incoming RF signal that is received from an external receive antenna 80; a digital audio band signal that is received from the digital audio interface 16; and left channel (called "LIN") and right channel (called "RIN") analog stereo channel signals that are received at input terminals 40 and 42, respectively.

Note that while shown with a single receive antenna 80, in various implementations separate antennas may be present for AM and FM modes. The FM antenna may be integrated in a portable device in which the multimode transceiver 10 is located. In contrast, an AM antenna may be provided externally from the portable system to avoid interference and other undesired effects. As described further below, the multimode transceiver 10 may automatically determine whether such an external AM antenna is present and enable or disable AM functionality based on the presence or non-presence.

Depending on the particular configuration of the multimode transceiver 10, the transceiver 10 may mix two or more of its input source signals together to generate various output signals: an outgoing FM transmission signal to drive an external transmit antenna 60; left channel (called "LOUT") and right channel (called "ROUT") analog stereo signals that appear at output terminals 52 and 50, respectively; and a digital output signal (called "DOUT") that is routed through the digital audio interface 16. In accordance with some embodiments of the invention, the multimode transceiver 10 may also provide a low impedance RF transmission output signal (called "TXB") at an output terminal 64 to drive a low impedance load.

A digital signal processor (DSP) 20 of the multimode transceiver 10 may perform both digital FM modulation (for the FM transmit mode) and digital AM and FM demodulation (for the receive mode) for the transceiver 10. Analog-to-digital converters (ADCs) 24 and 26 may perform transformations between the analog and digital domains for both complex (when the transceiver 10 is in the FM receive mode) and real (when the transceiver 10 is in the transmit modes) signals. Additionally, the ADCs 24 and 26 may be used in the audio mode for purposes of digitizing the LIN and RIN stereo channel signals. Digital-to-analog converters (DACs) 32 and 36 of the transceiver 10 may convert digital audio band signals from the digital to the analog domain for both the receive and audio modes. The DACs 32 and 36 are also used during the FM transmit mode to convert intermediate frequency (IF) band signals from the digital to the analog domain.

Turning now to the overall topology of the multimode transceiver 10, the transceiver 10 includes a multiplexer 95 to route the appropriate analog signals to the ADCs 24 and 26 for conversion. For example, the multiplexer 95 may select an incoming analog IF signal during the receive mode and select the LIN and RIN stereo channel signals during the FM transmit and audio modes. The digital signals that are provided by the ADCs 24 and 26 are routed to the DSP 20.

During reception, antenna 80 provides an input signal to a low noise amplifier (LNA) 82. As shown in FIG. 1, LNA 82 may be controlled by an automatic gain control (AGC) circuit 84. While not shown for ease of illustration, understand that a matching network may be coupled between the input to transceiver 10 and LNA 82. Such matching network may include a variable capacitor circuit that may pair a variable capacitance to the antenna inductance in AM receive mode.

For the receive modes, the multimode transceiver 10 includes analog mixers 90 that are coupled to a tunable local oscillator 92, the frequency of which selects the desired radio channel to which the transceiver 10 is tuned. In response to the incoming RF signal, the mixers 90 produce corresponding analog IF, quadrature signals that pass through programmable gain amplifiers (PGAs) 94 before being routed to the ADCs 24 and 26. Thus, the ADCs 24 and 26 convert the analog IF quadrature signals from the PGAs 94 into digital signals, which are provided to the DSP 20. The DSP 20 demodulates the received complex signal to provide corresponding digital left and right channel stereo signals at its output terminals; and these digital stereo signals are converted into the analog counterparts by the DACs 32 and 36, respectively. Mixing may then be performed by mixers, or analog adders 54, which provide the ROUT and LOUT stereo signals at the output terminals 50 and 52, respectively. Digital demodulated stereo signals may also be routed from the DSP 20 to the digital audio interface 16 to produce the DOUT digital signal.

In the FM transmit mode of the multimode transceiver 10, the content to be transmitted over the FM channel (selected by the frequency of the local oscillator 92, for example) may originate with the DIN digital data signal, the LIN and RIN stereo channel signals or a combination of these signals. Thus, depending on whether the analog signals communicate some or all of the transmitted content, the multimode transceiver 10 may use the ADCs 24 and 26. The DSP 20 performs FM modulation on the content to be transmitted over the FM channel to produce digital orthogonal FM signals, which are provided to the DACs 32 and 36 to produce corresponding analog orthogonal FM signals, which are in the IF range. Analog mixers 68 (which mix the analog orthogonal FM signals with a frequency that is selected by the local oscillator 92) of the multimode transceiver 10 frequency translate and combine the signals to produce an RF FM signal that is provided to the transmit antenna 60. In the audio mode of the multimode transceiver 10, the DSP 20 may be used to perform digital mixing. Analog mixing in the audio mode may be performed using the adder 54.

Among the other features of the multimode transceiver 10, in accordance with some embodiments of the invention, the transceiver 10 includes a control interface 38 that receives various signals 39 that control the mode (FM transmit, AM or FM receive or audio) in which the transceiver 10 is operating, as well as a given submode configuration. For example, different firmware present in the DSP 20 may be executed based on the selected mode of operation.

In accordance with some embodiments of the invention, the multimode FM transceiver 10 may also include a microcontroller unit (MCU) 98 that coordinates the general operations of the transceiver 10, such as configuring the ADCs 24 and 26 and DACs 32 and 36, configuring data flow through the multiplexer 95, or the like.

Furthermore, MCU 98 may enable automatic detection of an external AM antenna coupled to a portable device in which the multimode transceiver 10 is located. For example, in one implementation MCU 98 may be configured to perform a tuning algorithm for AM reception, e.g., on power up of a system in which the multimode transceiver 10 is located. If no such external antenna is present, the tuning algorithm may indicate an out of scale state. To reflect this state and the lack of an AM antenna, MCU 98 may set one or more status indicators, e.g., control flags within control interface 38 such as may be present in a control register of control interface 38. This flag or indicator may then be read by a system processor, such as an MCU or other controller of a portable system in which the multimode transceiver 10 is located. In other implementations, such automatic detection may be performed on a system level and accordingly, an enable signal may be provided via control interface 38 to enable AM functionality in the presence of an attached AM antenna or to otherwise disable such functionality if no AM antenna is attached.

Figure 2A:
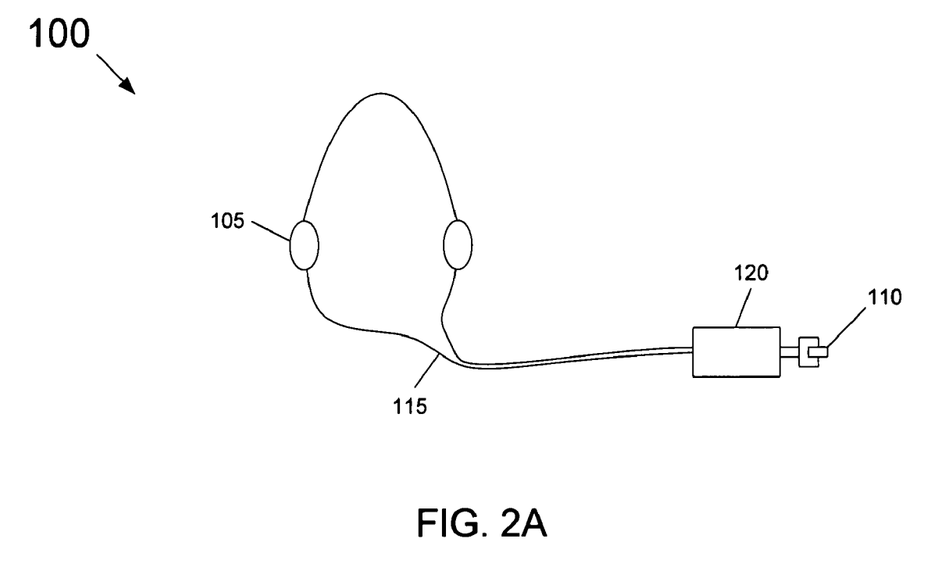
FIG. 2A is a view of an accessory device in accordance with an embodiment of the present invention.

Referring now to FIG. 2A, shown is an illustration of an accessory device in accordance with an embodiment of the present invention. As shown in FIG. 2A, accessory device 100 may be headphones for coupling to a portable system. The headphones may take the form of headphones, earbuds or so forth (generically headphones). Shown in FIG. 2A, headphones 100 include earpieces 105 and further include a connector 110 located distally from earpieces 105. Still further, along a length of cabling 115, an AM antenna 120 may be present. As shown in the embodiment of FIG. 2A, AM antenna 120 may be present within cabling 115 and more particularly located at a distal portion of headphones 100, close to connector 110. While shown at this particular location in the embodiment of FIG. 2A, the scope of the present invention is not limited in this regard. In various implementations, antenna 120 may be a miniature ferrite loop stick antenna, a loop antenna or other such antenna. In manufacture, AM antenna 120 may be affixed to conductors providing connection to earphones 105. Then an external insulator may be adapted around these conductors. This insulator thus forms a housing. Note that the housing may include a relatively rigid portion within which the AM antenna may be located.

While shown in the embodiment of FIG. 2A as being included in headphones, in other embodiments an AM antenna may be included in other accessory devices. For example, in another embodiment an AM antenna may be included in an external adaptor to which a portable system may be coupled. For example, a universal serial bus (USB) connector or another type of connector may be included on a portable system so that the portable system can be powered by an external source, e.g., via the USB bus itself, a cradle in which the portable device is located or so forth. This external device, whether in the form of a cradle, or connector or other configuration may be adapted to include an AM antenna within its housing. Still further examples of accessory devices may include, for example, an adaptor for connection to another system, such as a home or car stereo system or so forth.

Figure 2B:
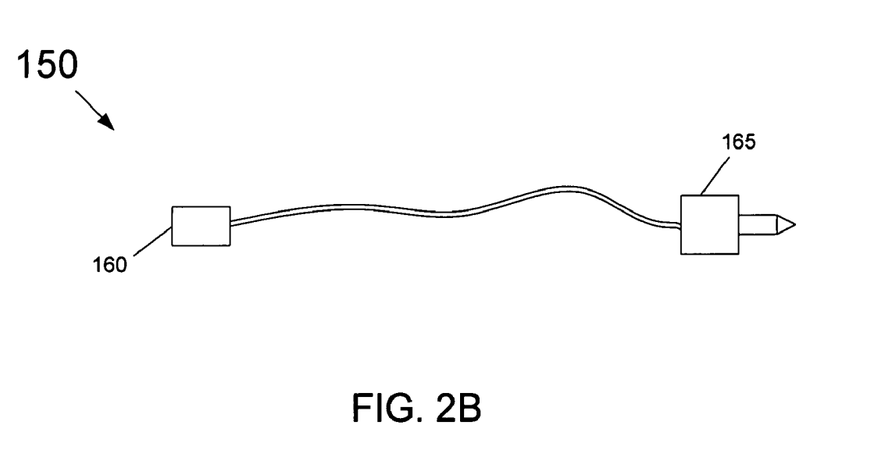
FIG. 2B is a drawing of an accessory device in accordance with another embodiment.

For example, in some implementations either a separate accessory device may include an AM antenna, or the accessory device may provide an interconnection between headphones including an AM antenna and a portable device to enable coupling of the AM antenna to the portable device to enable AM reception, which is then played through a speaker of the portable system, rather than through the associated headphones. Referring now to FIG. 2B, shown is a drawing of an accessory device in accordance with such an embodiment. Specifically, as shown in FIG. 2B, accessory device 150 may generally take the form of a cable extension having first and second connectors 160 and 165. First connector 160 may be used to couple accessory device 150 to connector 110 of headphones 100, for example, while second connector 165 may provide a connection to an associated radio receiver such as a portable device. In such an implementation, note that second connection 165 may include only a ground contact and an antenna contact. That is, this second connection may not include contacts for audio output data, e.g., left and right audio contacts that would be used to provide audio to the headphones. In this way, accessory device 150 may be used independently of the headphone portion of headphones 100 to enable listening to AM content on a speaker of the device.

Figure 3:
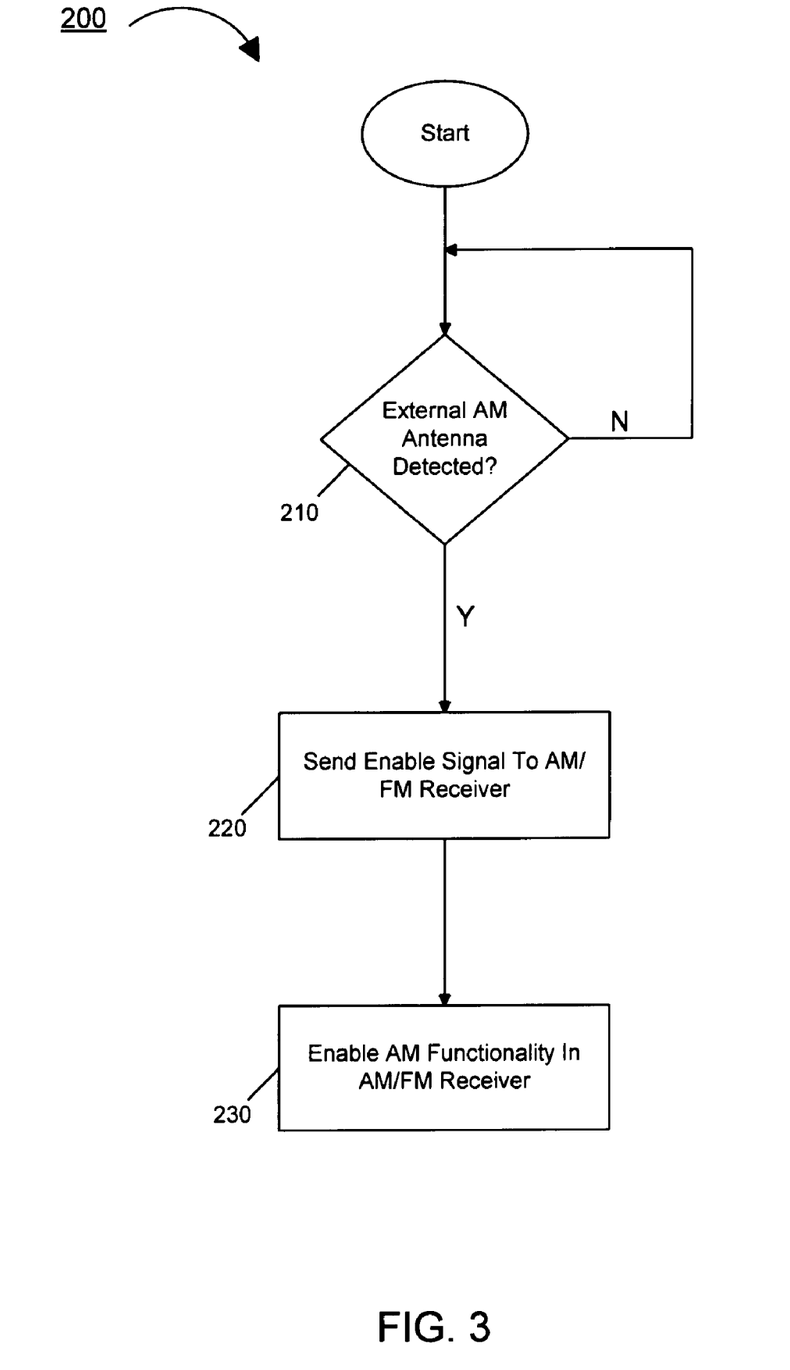
FIG. 3 is a flow diagram of a method in accordance with an embodiment of the present invention.

As described above, in various embodiments different manners of detecting presence of an external AM antenna and controlling operation of an associated receiver can be realized. Referring now to FIG. 3, shown is a flow diagram of a method in accordance with an embodiment of the present invention. As shown in FIG. 3, method 200 may be used to perform automatic detection and control of AM operation based on antenna presence. As shown in FIG. 3, method 200, which may be performed by a MCU of a portable system or a radio receiver component within the system, may begin by determining whether an external AM antenna has been detected (diamond 210). If not, no further action occurs and control loops back to diamond 210 for a possible later determination (e.g., on a different system start up) of whether an AM antenna has been detected.

Referring still to FIG. 3, if instead an AM antenna has been detected, control passes to block 220. At block 220 an enable signal may be sent to an AM/FM receiver to enable AM functionality. Based on this enable signal, AM functionality may be enabled in the AM/FM receiver component (block 230). Note that the implementation shown in FIG. 3 may be for automatic detection performed by an MCU. Such automatic detection may be realized by determining in the MCU, whether an external device has been connected via a bridge between a connector for the external device and the MCU.

Figure 4:
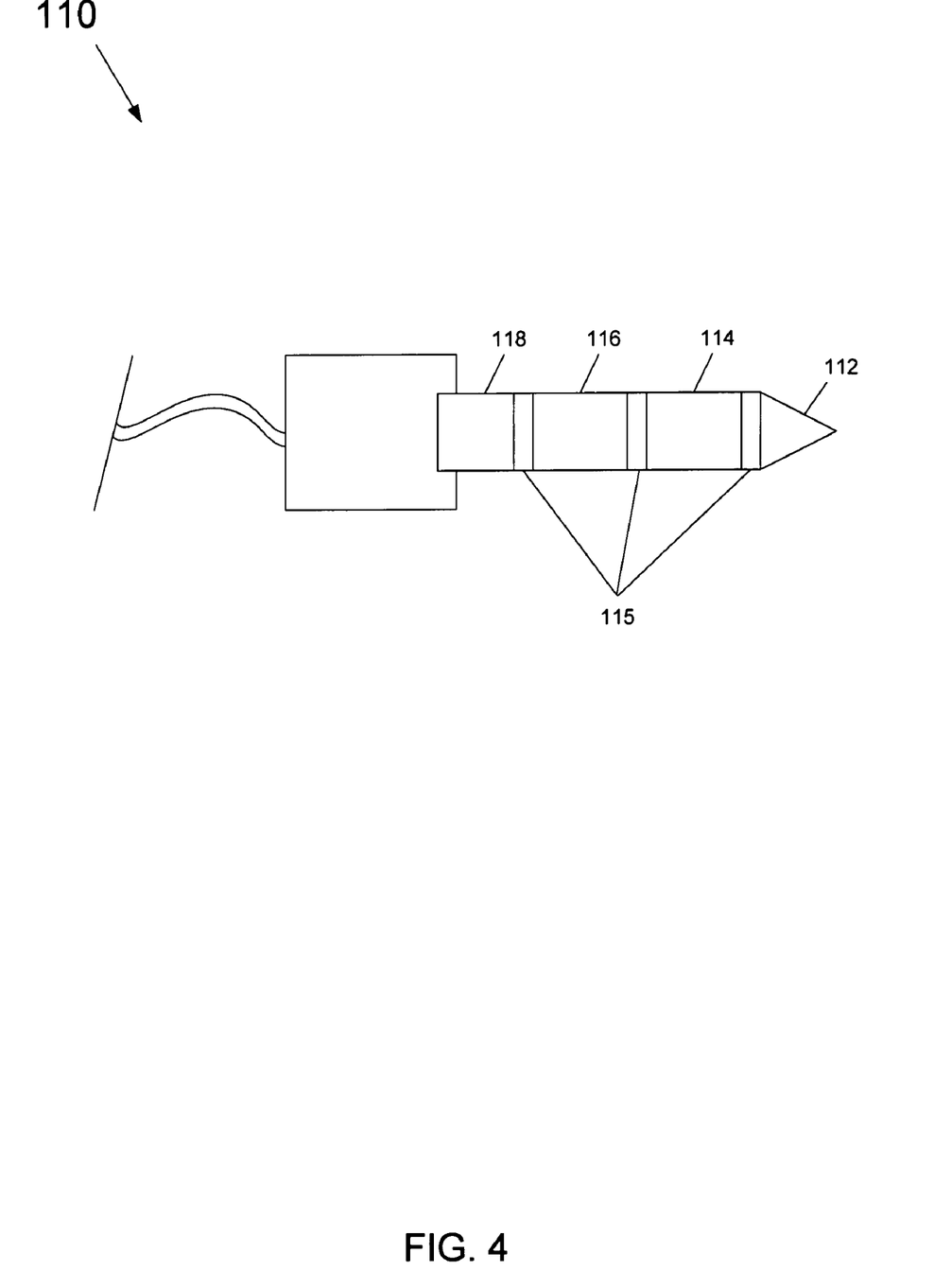
FIG. 4 is a block diagram of a connector in accordance with an embodiment of the present invention.

For example, an automatic detection scheme may be implemented in embodiments in which a connector headphone includes a specialized contact system to enable input of AM RF signals via an antenna connection, as well as output contacts to receive processed audio data, e.g., left and right audio channels. Specifically, as shown in FIG. 4, a connector 110, such as that which may be present in headphones 100 of FIG. 2 includes a plurality of contact portions generally arranged in a so-called tip ring sleeve (TRS) connector. Specifically, as shown in FIG. 4, connector 110 includes a distal portion 112, mid portions 114 and 116, and a proximal portion 118. Note that the various portions are separated by insulating rings 115. In the embodiment of FIG. 4, audio output data, e.g., to be provided to headphones may be provided along portions 112 and 114. In turn, RF signals to be input into the radio receiver may be provided via an antenna portion 116, while proximal portion 118 provides a ground connection. In this implementation, a short may result when connector 110 is provided into a standard headphone connector, while an open is present when connector 110 is placed into a connector in accordance with an embodiment of the present invention.

In other embodiments, automatic detection may be performed by the AM receiver itself. For example, in some embodiments upon powering up an AM receiver may perform a tuning algorithm to tune the antenna with a programmable/tunable matching network, e.g., pairing a variable capacitance to the antenna. If the operation of the tuning algorithm indicates that the incoming signal is out of scale, this may be an indication that no antenna is present. Accordingly, the receiver may set a flag or indicator in a control register to indicate the lack of an AM receiver. The associated MCU of the portable system may read this register and, optionally, indicate to a user that no AM antenna has been detected and either request the user to attach an AM antenna or to simply indicate that no AM functionality is present.

Figure 5:
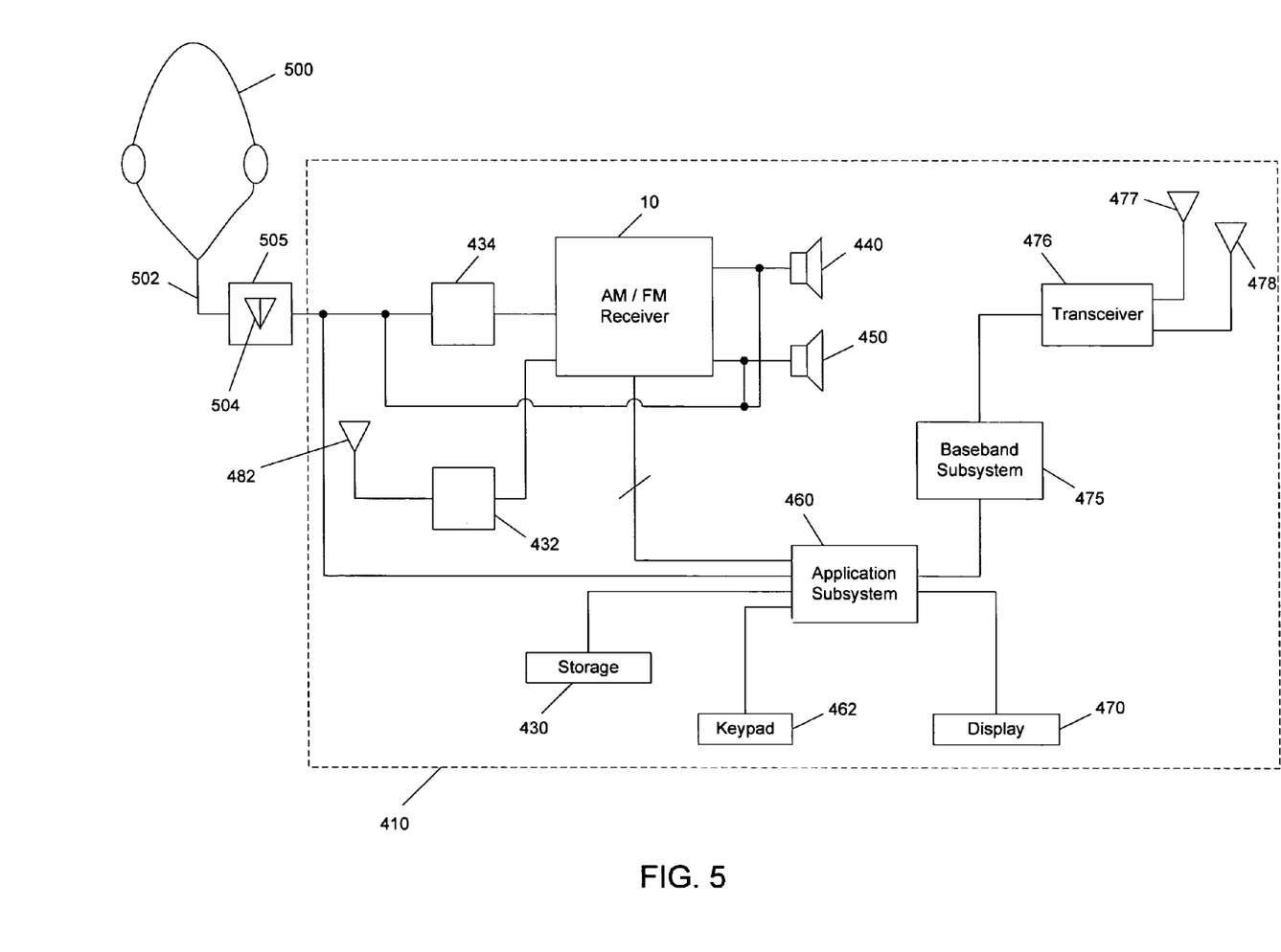
FIG. 5 is a block diagram of a system in accordance with an embodiment of the present invention.

Referring to FIG. 5, in accordance with some embodiments of the invention, an AM/FM receiver 10 (such as an implementation of that shown in the embodiment of FIG. 1) may be part of a multimedia portable device 410. As examples, the portable device 410 may be a dedicated MP3 player, a cellular telephone or PDA with audio capabilities.

Among its other functions, the wireless device 410 may store digital content on a storage 430, which may be a flash memory or hard disk drive, as a few examples. The wireless device 410 generally includes an application subsystem 460 that may, for example, receive input from a keypad 462 of the wireless device 410 and display information on a display 470. Furthermore, the application subsystem 460 may generally control the retrieval and storage of content from the storage 430 and the communication of, e.g., audio with the AM/FM receiver 10. As shown, AM/FM receiver 10 may be directly connected to speakers 440 and 450 for output of audio data. As depicted in FIG. 5, the AM/FM receiver 10 may be coupled by a matching network 432 to an FM receiver antenna 482 and may be coupled by a matching network 434, which could be tunable or programmable, to an external AM antenna 504, which may be present in a housing portion 505 adapted to a cable 502 of a set of headphones 500. Note that to provide audio to headphones 500, the outputs of AM/FM receiver 10 may be coupled back to the headphones. Furthermore, in some implementations a line from the external connector to which headphones 500 are connected may be provided to application subsystem 460. In such implementations, automatic detection regarding the presence or lack of an associated external AM antenna may be performed within application subsystem 460. In turn, if no such antenna is detected, AM functionality of AM/FM receiver 10 may be disabled. Furthermore, application subsystem 460 may cause display of a message to a user on display 470 to indicate the lack of an external antenna. In other implementations, a tuning algorithm within AM/FM receiver 10 may enable or disable such AM functionality based on antenna presence and accordingly provide status information, e.g., in the form of a status flag to application subsystem 460 to indicate availability of AM functionality.

In accordance with some embodiments of the invention, the wireless device 410 may have the ability to communicate over a communications network, such as a cellular network. For these embodiments, the wireless device 410 may include a baseband subsystem 475 that is coupled to the application subsystem 460 for purposes of encoding and decoding baseband signals for this wireless network. Baseband subsystem 475 may be coupled to a transceiver 476 that is connected to corresponding transmit and receive antennas 477 and 478.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    headphones including a pair of earpieces to provide audio signals to a user, the headphones separate from and connectable to a portable system, the headphones further having a cabling portion that in turn is to couple to the portable system including an amplitude modulation (AM) radio receiver, the cabling portion further including an AM antenna, wherein the AM antenna is located at a distal portion of the cabling portion with respect to the earpieces; and
    an external connector coupled to the distal portion of the cabling portion to connect the pair of earpieces to the portable system, wherein the external connector includes a pair of audio contacts to provide audio signals to the earpieces, an antenna contact to provide an AM signal from the AM antenna to the AM radio receiver, and a ground contact, wherein the portable system does not include an AM antenna and includes an FM antenna, and is to automatically detect presence of the AM antenna when the headphones are coupled to the portable system, and is to detect no presence of the AM antenna if a tuning algorithm indicates an incoming signal is out of scale.

2. The apparatus of claim 1, wherein the AM antenna comprises a miniature ferrite loop antenna stick.

3. The apparatus of claim 1, wherein the external connector is to couple the portable system to a second system.

4. The apparatus of claim 1, wherein the portable system is to enable functionality of the AM radio receiver responsive to the automatic detection, otherwise to disable the functionality.

5. The apparatus of claim 1, further comprising an accessory device into which the external connector is to be coupled, wherein the accessory device is to couple the AM antenna to the portable system and to prevent an audio output signal to the earpieces, wherein the portable device includes a speaker to output the audio output signal.

6. A method comprising:
    automatically detecting presence of an AM antenna, unassociated with processing circuitry and located externally from a portable device including an amplitude modulation (AM) receiver, in the portable device via a tuning algorithm of the AM receiver using an input matching network having a variable capacitance, wherein the portable device does not include an AM antenna;

enabling functionality of the AM receiver if the external AM antenna is detected, otherwise disabling the functionality and reporting the non-functionality to a user of the portable device; and detecting no presence of the external AM antenna if the tuning algorithm indicates an incoming signal is out of scale.

7. The method of claim 6, further comprising automatically detecting the presence using a controller of the portable device and enabling the AM receiver via a control signal from the controller if the external AM antenna is detected.

8. The method of claim 6, further comprising setting a status indicator in a control register of the AM receiver if the external AM antenna is detected, otherwise resetting the status indicator.

9. The method of claim 8, further comprising reading the control register with a controller of the portable device and reporting the non-functionality by providing a message to a display of the portable device.

10. A system comprising:

a portable system including a multimode radio receiver to receive AM and FM signals integrated on a complementary metal oxide semiconductor (CMOS) substrate and an output device to output an audio signal;

headphones for coupling to the portable system, the headphones having a pair of earpieces, a cabling portion including an AM antenna, and a connector to enable the coupling to the portable system, the connector including first and second audio contacts to enable receipt of an AM audio signal in the pair of earpieces from the portable system and an antenna contact to enable transmission of an AM radio signal from the AM antenna to the portable system; and wherein the portable system includes an FM antenna and does not include an AM antenna, and wherein the portable system is to automatically detect presence of the AM antenna in the headphones when the headphones are coupled to the portable system, an input matching network coupled between an input connector and an AM radio receiver to receive the AM radio signal, the input matching network to couple a variable capacitance to the AM radio signal and to automatically detect the presence using a tuning algorithm and to detect no presence of the AM antenna if the tuning algorithm indicates an incoming signal is out of scale.

11. The system of claim 10, further comprising an accessory device to be coupled between the headphones and the portable system, wherein the accessory device is to couple the AM antenna to the portable system and to prevent the AM audio signal from transmission to the earpieces if the output device of the portable system is enabled.

12. The method of claim 6, further comprising automatically detecting the external AM antenna presence when a first contact portion of a headphone connector of headphones including a cabling portion having the external AM antenna is provided into a corresponding headphone connector of the portable device.

13. The apparatus of claim 1, further comprising a plurality of insulating rings to separate the pair of audio contacts, the antenna contact, and the ground contact.

14. The apparatus of claim 1, wherein a short results when the external connector is provided into a headphone connector of a portable system unconfigured for receipt of an RF signal from the headphones, and an open results when the external connector is provided into a headphone connector of a portable system configured for receipt of an RF signal from the headphones.

* * * * *